(12) United States Patent
Morris et al.

(10) Patent No.: US 6,458,480 B1
(45) Date of Patent: *Oct. 1, 2002

(54) MOVABLE ANODE FUEL CELL BATTERY

(75) Inventors: William F. Morris, Harrison, NY (US); Tsepin Tsai, Chappaqua, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/526,669

(22) Filed: Mar. 15, 2000

Related U.S. Application Data

(63) Continuation-in-part of application No. 09/268,150, filed on Mar. 15, 1999, now Pat. No. 6,299,998.

(51) Int. Cl.⁷ .......................... H01M 2/38; H01M 8/04; H01M 8/12
(52) U.S. Cl. ............................ 429/69; 429/68; 429/22; 429/26
(58) Field of Search ............................. 429/22, 26, 68, 429/69

(56) References Cited

U.S. PATENT DOCUMENTS

| | | | |
|---|---|---|---|
| 3,252,838 A | 5/1966 | Huber et al. | 136/86 |
| 3,260,620 A | 7/1966 | Gruber | 136/86 |
| 3,357,864 A | 12/1967 | Huber | 136/113 |
| 3,432,354 A | 3/1969 | Jost | 136/86 |
| 3,436,270 A | 4/1969 | Oswin et al. | 136/86 |
| 3,454,429 A | 7/1969 | Gruber | 136/86 |
| 3,532,548 A | 10/1970 | Stachurski | 136/86 |
| 3,536,535 A | 10/1970 | Lippincott | 136/86 |
| 3,577,281 A | 5/1971 | Pountney et al. | 136/6 |
| 3,663,298 A | 5/1972 | McCoy et al. | 136/31 |
| 3,717,505 A | 2/1973 | Unkle, Jr. et al. | 136/86 A |
| 3,822,149 A | 7/1974 | Hale | 136/86 A |
| 3,845,835 A | 11/1974 | Petit | 180/60 R |

(List continued on next page.)

FOREIGN PATENT DOCUMENTS

GB       1176488       1/1970       .......... H01M/29/02

OTHER PUBLICATIONS

Convert 3V To 5V Without Inductors by , Maxim Integrated Products; http://www.maxim–ic.com, vol. 92, 2000, p. 1–3.
Derive 5V From Four AA Cells by , Maxim Integrated Products; http://www.maxim–ic.com, vol. 128, 2000, p. 1–2.
Boost/Linear Regulator Derives 5B From Four Cells by , Maxim Integrated Products, http://www.maxim–ic.com, 2000.
Fuel Cell Technology & Applications, http://www.metallicpower.com/rtfuel.htm by , Metallic Power, Inc., 1999.
Fuel Cells and Their Applications by Karl Kordesch and Gunter Simader, VCH Publishers, Inc., New York NY, Chapters 4.8.1–4.8.2, 1996, p. 158–162.

(List continued on next page.)

*Primary Examiner*—Steven H. Ver Steeg
(74) *Attorney, Agent, or Firm*—Thomas J. Perkowski, Esq. PC; Ralph J. Crispino

(57) ABSTRACT

A metal-air fuel cell battery (FCB) system includes an electrolyte, air electrodes, and a movable anode having anode material deposited on two sides of an electrically conductive substrate. The anode can be, for example, either a rotating anode disk, or a linearly-movable anode, sandwiched between the two air electrodes. The air electrodes each have at least one recharging portion and at least one discharging portion. The anode movement, which can be, for example, rotational or linear, is relative to the recharging air electrode portion for recharging the anode material and relative to the discharging air electrode portion for discharging the anode material.

29 Claims, 3 Drawing Sheets

U.S. PATENT DOCUMENTS

| | | | |
|---|---|---|---|
| 3,909,685 A | 9/1975 | Baker et al. | 318/139 |
| 3,928,072 A | 12/1975 | Gerbler et al. | 136/86 A |
| 3,963,519 A | 6/1976 | Louie | 136/86 A |
| 3,977,901 A | 8/1976 | Buzzelli | 436/86 A |
| 4,052,541 A | 10/1977 | Krusenstierna | 429/233 |
| 4,152,489 A | 5/1979 | Chottiner | 429/27 |
| 4,172,924 A | 10/1979 | Warszawski | 429/15 |
| 4,246,324 A | 1/1981 | de Nora et al. | 429/17 |
| 4,331,742 A | 5/1982 | Lovelace et al. | 429/33 |
| 4,341,847 A | 7/1982 | Sammells | 429/27 |
| 4,551,399 A | 11/1985 | Despic | 429/27 |
| 4,560,626 A | 12/1985 | Joy | 429/27 |
| 4,626,482 A | 12/1986 | Hamlen et al. | 429/27 |
| 4,689,531 A | 8/1987 | Bacon | 318/139 |
| 4,693,946 A | 9/1987 | Niksa et al. | 429/27 |
| 4,714,662 A | 12/1987 | Bennett | 429/27 |
| 4,828,939 A | 5/1989 | Turley et al. | 429/38 |
| 4,913,983 A | 4/1990 | Cheiky | 429/13 |
| 4,916,036 A | 4/1990 | Cheiky | 429/127 |
| 4,950,561 A | 8/1990 | Niksa et al. | 429/27 |
| 4,957,826 A | 9/1990 | Cheiky | 429/27 |
| 4,968,396 A | 11/1990 | Harvey | 204/131 |
| 5,121,044 A | 6/1992 | Goldman | 320/2 |
| 5,185,218 A | 2/1993 | Brokman et al. | 429/27 |
| 5,190,833 A | 3/1993 | Goldstein et al. | 429/27 |
| 5,196,275 A | 3/1993 | Goldman et al. | 429/27 |
| 5,242,765 A | 9/1993 | Naimer et al. | 429/42 |
| 5,250,370 A | 10/1993 | Faris | 429/68 |
| 5,260,144 A | 11/1993 | O'Callaghan | 429/14 |
| 5,306,579 A | 4/1994 | Shepard, Jr. et al. | 429/40 |
| 5,312,701 A | 5/1994 | Khasin et al. | 429/42 |
| 5,318,861 A | 6/1994 | Harats et al. | 428/21 |
| 5,328,777 A | 7/1994 | Bentz et al. | 429/27 |
| 5,328,778 A | 7/1994 | Woodruff et al. | 429/27 |
| 5,354,625 A | 10/1994 | Bentz et al. | 429/17 |
| 5,360,680 A | 11/1994 | Goldman et al. | 429/27 |
| 5,362,577 A | 11/1994 | Pedicini | 429/27 |
| 5,366,822 A | 11/1994 | Korall et al. | 429/27 |
| 5,387,477 A | 2/1995 | Cheiky | 429/26 |
| 5,389,456 A | 2/1995 | Singh et al. | 429/27 |
| 5,405,713 A | 4/1995 | Pecherer et al. | 429/49 |
| 5,411,592 A | 5/1995 | Ovshinsky et al. | 118/718 |
| 5,418,080 A | 5/1995 | Korall et al. | 429/27 |
| 5,439,758 A | 8/1995 | Stone et al. | 429/63 |
| 5,447,805 A | 9/1995 | Harats et al. | 429/27 |
| 5,462,816 A | 10/1995 | Okamura et al. | 429/18 |
| 5,486,429 A | 1/1996 | Thibault | 429/27 |
| 5,512,384 A | 4/1996 | Celeste et al. | 429/51 |
| 5,525,441 A | 6/1996 | Reddy et al. | 429/127 |
| 5,536,592 A | 7/1996 | Celeste et al. | 429/68 |
| 5,554,452 A | 9/1996 | Delmolino et al. | 429/10 |
| 5,569,551 A | 10/1996 | Pedicini et al. | 429/27 |
| 5,582,931 A | 12/1996 | Kawahami | 429/127 |
| 5,599,637 A | 2/1997 | Pecherer et al. | 429/27 |
| 5,691,074 A | 11/1997 | Pedicini | 429/27 |
| 5,711,648 A | 1/1998 | Hammerslag | 414/786 |
| 5,721,064 A | 2/1998 | Pedicini et al. | 429/27 |
| 5,726,551 A | 3/1998 | Miyazaki et al. | 320/6 |
| 5,756,228 A | 5/1998 | Roseanou | 429/68 |
| 5,771,476 A | 6/1998 | Mufford et al. | 701/22 |
| 5,904,999 A | 5/1999 | Kimberg et al. | 429/27 |
| 5,978,283 A | 11/1999 | Hsu et al. | 365/189.09 |
| 6,057,052 A | 5/2000 | Shrim et al. | 429/27 |
| 6,075,576 A * | 6/2000 | Tan et al. | 348/845.3 |
| 6,299,998 B1 * | 10/2001 | Morris et al. | 429/27 |

OTHER PUBLICATIONS

LBL Researchers Work on New Generation of Batteries by Jeffery Kahn, www.lbl.gov/Science–Articles/Archive/battery–development–at–lbl.html, 1990, p. 1–6.

Fabrication of Thin–Film LIMN2O4 Cathodes for Rechargeable Microbateries by F.K. Shokoohi, et al., Applied Physics Letters, 1991, p. 1260–1262.

Battery Chargers by Mike Allen, Popular Mechanics, 1991, p. 30–31.

New Age EVs by Herb Schuldner, Popular Mechanics, 1991, p. 27–29.

Marketing Study for AER Energy Resources, Inc. by Authors not indicated, AER Energy Resources, Inc., 1991, p. 6–28.

Electric Car Showdown in Phoenix by Rick Cook, Popular Science, 1991, p. 64–65,82.

Batteries for Cordless Appliances by Ralph J. Brodd, Ch. 3 of Batteries for Cordless Appliances, 1987, p. 49–59.

105–044 PCT000 Search Report, 1998.

105–040PCT000 Search Report, 1998.

105–041PCT000 Search International Search Report, 1997.

* cited by examiner

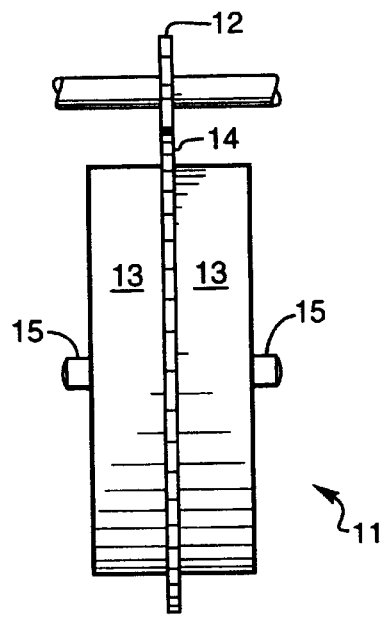
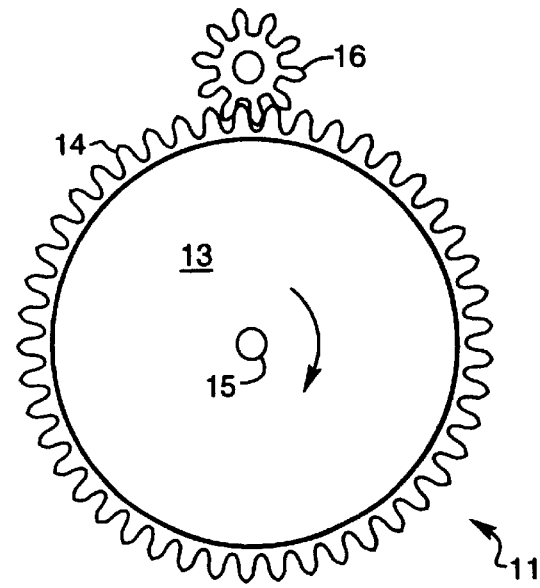
Fig. 1
Fig. 2
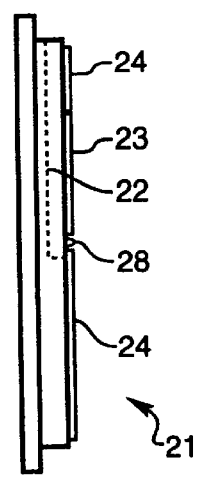
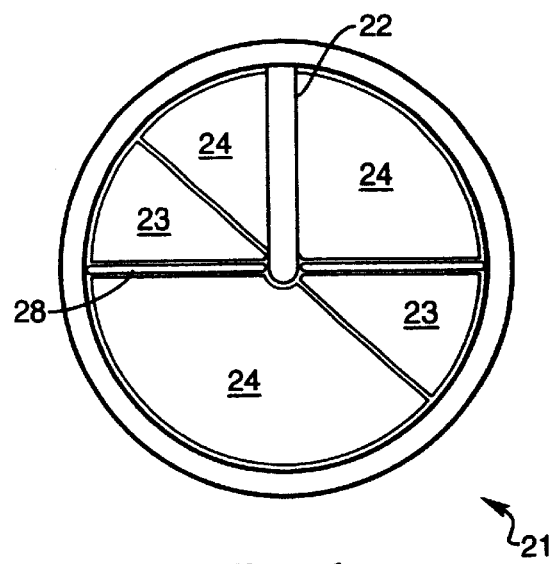
Fig. 3
Fig. 4

MOVABLE ANODE FUEL CELL BATTERY

RELATED CASES

This Application is a Continuation-in-Part of U.S. application Ser. No. 09/268,150 entitled "Movable Anode Fuel Cell Battery" by William F. Morris and Tsepin Tsai filed Mar. 15, 1999, now U.S. Pat. No. 6,299,998 B1, incorporated herein by reference.

BACKGROUND OF INVENTION

1. Field of Invention

The present invention relates to improvements in metal-air fuel cell battery (FCB) systems and devices, and more particularly to a movable anode design for use in such systems and devices in order to obtain improvements in charging and discharging of the anode structures employed therein.

2. Brief Description of the Prior Art

The use of metal-air FCB systems and devices for electrical power generation offers great promise for the future of mankind.

U.S. Pat. No. 5,250,370 to Faris discloses an exemplary metal-air FCB system. According this metal-air FCB system design, a bifunctional air electrode is arranged on one side of a rotating anode structure, for carrying out discharging and recharging operations.

Also, WIPO Publications WO 99/18627, WO 99/18628 and WO 99/18620 by Applicant disclose various types of metal-air FCB systems employing moving anode and cathode structures which can be used to generate electrical power for a variety of applications using a metal, such as zinc, and air as fuel. However despite the incredible advances that such metal-air FCB systems represent to the electrical power industry, there nevertheless remain a number technical problems which limit the recharging performance of such electrical power generation systems. In large part, such problems are due to a number of factors, including: (i) the deformation of shape/geometry of the anode structure; (ii) densification of the anode structure; and (iii) formation dendrites on the anode structure which reach through the separator, touch the air electrode, and eventually short out the cell. In general, such anode related problems have limited the operational life of prior art rechargeable FCB systems and devices.

Hitherto, prior art solutions to these problems have typically involved decreasing the current density of the anode structure during both discharging and recharging operation, as well as the depth of discharge thereof. Both of these side-effects have severely limited the energy and power density characteristics of prior art metal-air FCB systems. Thus, in prior art metal-air FCB systems and devices, there has been a serious trade off between achieving high energy/power densities and good charging characteristics.

Also, when using prior art techniques, it has not been possible to construct a bifunctional air electrode for use in metal-air FCB systems which operates in an efficient manner during both recharging and discharging operations.

Another problem with prior art FCB systems is that the anode structure undergoes deformation during the lifetime of the system. When the anode undergoes deformation during each recycling/recharging operation, the capacity of the system decreases significantly, and shorting problems often occur.

One attempt to solve the anode deformation problem has been to use a reticulated sponge-like zinc anode in order to increase the surface area of the zinc (and thus decrease the current density therewithin). However, the lowered current density decreases the energy density of the FCB system. Also, the use of a reticulated sponge-like zinc anode does not prevent the growth of dendrites on the anode.

Attempts by others have been made to limit dendrite growth on reticulated zinc anode structures. One approach has involved using a chemically inert coating on the exterior of the anode structure. While this reduces dendrite growth, the loss of the anode area lowers the capacity of the cell.

Prior art attempts to reduce anode deformation have involved the use of a pump to circulate the electrolyte. By continually stirring the electrolyte within the cell, a more uniform distribution of zinc ions in solution will result. A uniform mixture of zinc ions in the electrolyte can greatly reduce anode shape deformation over repeated cycling.

U.S. Pat. No. 3,663,298 discloses a method of reducing anode shape deformation and dendrite growth. According to this prior art approach, zinc pellets and electrolyte are used to fill about $2/3$ of the volume of a circular rotating drum, on the walls of which the air electrode is formed. The drum rotates during discharging and recharging operations, and the zinc particle bed continually mixes within the cell. Because the particles move freely, fresh zinc continually and evenly is exposed to the air electrode. By evenly depositing zinc during recharging operations, a longer discharge life can be achieved at higher current densities.

U.S. Pat. No. 3,663,298 discloses that the use of a rotatable electrode improves the recharging characteristics of metal-air FCB systems. As disclosed, this technique enables repeated recharging and discharging a rotating electrode at rates up to 100 $mA/cm^2$. Conventional zinc electrodes do not ordinarily withstand recharge rates in excess of 20 $mA/cm^2$ on repeated cycling without rapid failure by dendrite shorting. The high recharging rates were possible because the continual movement of the particle bed provided for a smooth, dendrite free, zinc coating on the pellets.

While rotatable electrode concept of U.S. Pat. No. 3,663,298 improved upon conventional zinc/air FCB technology, it required the use of an inefficient bifunctional air electrode.

Bifunctional air electrodes have very low cycle numbers because the electrode has to be used both for charging and discharging. Bi-functional electrodes are inefficient for discharging because they must simultaneously be optimized for recharging. In addition, prior art bi-functional electrodes are generally thick and heavy to slow down degradation processes. Their significant weight and size reduces the energy density of the system. In the past, others have tried using many different catalysts and different electrode structures to make bifunctional air electrodes with improved performance characteristics, but the lives of prior art rechargeable zinc-air FCB systems have been severely limited.

In the Sony Corporation publication entitled "Fuel Cell and their Application" published in 1996 (at pg. 160), there is disclosed a rechargeable metal/air FCB system design employing a third electrode. This FCB system comprises a zinc anode sandwiched between one recharging air electrode and one discharging air electrode. This prior art approach to metal-air FCB construction sought to eliminate the need for a bifunctional air electrode. According to the approach, the zinc anode would be discharged from one side and recharged from the opposite side, while using different discharging an d recharging electrodes that are optimized for their independent functions.

While Sony's zinc/air cell was an improvement on the bifunctional air electrode, the zinc anode could only be discharged form one side, thus reducing the power capabilities of the cell by 50%. Further, the zinc anode is charged from the side where it was discharged the least, which decreases the efficiency of the system.

Another problem presented by the Sony design is that the anode has to be a porous structure so that the electrolyte can flow from the discharge side to the recharge side to provide ions in solution from discharging in order to recharge again.

Thus, there is a great need in the art for an improved way of and means for producing electrical power using a rechargeable metal-air FCB system having high energy density, high power density, and good rechargeability, while overcoming the shortcomings and drawbacks of prior art technology.

OBJECTS OF THE PRESENT INVENTION

Accordingly, it is a primary object of the present invention is to provide an improved rechargeable metal-air FCB system having high energy density, high power density, and good rechargeability.

Another object of the present invention is to provide a metal-air FCB system having metal anodes which do not undergo any significant shape deformation (i.e. change) during charging and discharging operations, in order to ensure a longer battery life.

Another object of the present invention is to provide such a metal-air FCB system, wherein dendrite formation on metal anodes is controlled.

Another object of the present invention is to provide such a metal-air FCB system having a fast recharging capability.

Another object of the present invention is to provide a metal-air FCB system having an increased turnaround efficiency for recharging the anode structures employed within such a system. Another object of the present invention is to provide such a metal-air FCB system, wherein the anode structure is realized in the form of a disc structure on which metal fuel material is supported.

In accordance with one aspect of the present invention, a novel metal-air FCB system is provided, wherein a movable anode is sandwiched between two stationary air electrodes. The air electrodes are divided into a recharge air electrode portion, to maximize recharging of the anode structure, and a discharge air electrode portion for maximizing the discharging of the anode structure. The anode structure is moved either rotationally or linearly with respect to the air electrodes; exposing portions of the anode alternately to the recharging and discharging portions of the air electrode. Electrolyte fills the space between the air electrodes and the movable anode structure.

Previous solutions to the metal/air rechargeability problem could only increase cycle life at the expense of decreasing energy and power densities. In marked contrast, the movable anode FCB system of the present invention has both increased cycle life and discharge performance. Recycleability is increased for the following reasons.

The recharging electrode of the present invention is intended solely for recharging operations, and thus there is no need to use a bifunctional air electrode. An air electrode intended solely for recharging operations will not limit the lifetime of the cell. The cycle life of the cell will be limited by the lifetime of the anode structure.

The electrolyte in each cell of the FCB system is continually stirred during recharging operations. The stirring action creates an even distribution of zinc ions in solution. This results in an even plating on the zinc anode, which greatly reduces the anode shape deformation.

In accordance with the present invention, the anode structure of the FCB system is continually moving during recharging operations, which greatly reduces dendrite growth and anode shape deformation. These phenomena occur because of an uneven electric field distribution on the zinc surface. If one spot has a slightly higher electric field than another, this spot will continually attract zinc ions. However, with the anode moving, the point of peak electric field will be changing positions and moving in and out of the recharging area; reducing the chances of localized buildup. If the movement alone does not stop dendrite growth, they can be removed mechanically by a stationary wiper attached to the air electrode holder. As the anode moves past this wiper, the dendrites will be smoothed out or scraped off.

The recharging air electrode of the present invention can be several times larger than the discharging air electrode. This will allow for fast recharging operations, while still using a low current density. In prior art fixed anode FCB systems, the only way to decrease charging time was to increase charging current density. High charging current density significantly decreases cycle life, and turnaround efficiency which is defined as a ratio of the power output of a cell and the power required to charge it. A decreased turnaround efficiency implies less electrical power is required to charge the cell.

In the metal-air FCB system of the present invention, high energy density is obtained for the following reasons.

The design of the movable anode FCB system of the present invention allows the weight of the cell to be dominated by the metal anode. Consequently, the energy density of the cell has the ability to approach that of the metal anode.

The movable anode FCB system of the present invention has the ability to increase energy density by increasing the anode's depth of discharge (DOD). This means a greater percentage of the anode can be discharged. The movable Anode FCB system can increase ODD because it limits passivation. An anode will passivate if too much current is drawn from it in too short a time. Passivation can be substantially decreased if the anode is discharged intermittently (in other words, allowing the anode to rest between discharging can eliminate passivation). The movable anode FCB system of the present invention will do exactly that. As each anode section moves away from the discharge electrode, it has a rest period before it is discharged some more. In addition, because of the moveable anode's unique recharging capabilities, the anode can afford to be discharged to a high DOD without sacrifice of cycle life whereas most recharging batteries must limit their DOD to ensure reasonable recycleability.

The discharging air electrode in the FCB system of the present invention is intended solely for carrying out discharging operations, and therefore, there is no need for the use of bi-functional air electrodes. This implies that the discharge electrode can be optimized exclusively for discharging.

Preferably, the electrolyte in each cell of the metal-air FCB system of the present invention is continually stirred during discharging operations. By stirring the electrolyte, it is possible to increase its capacity, implying that less electrolyte is needed, which translates to a higher energy density.

Other objects, advantages and novel features of the present invention will become apparent from the following detailed description of the invention when considered in conjunction with the accompanying drawings.

BRIEF DESCRIPTION OF THE DRAWINGS

For a more complete understanding of the objects of the present invention, the following Best Modes For Carrying Out The Present Embodiments set forth below should be read in conjunction with the accompanying Drawings, wherein:

FIG. 1 is a top view of the anode disk of the present invention;

FIG. 2 is a side view of the anode disk of the present invention;

FIG. 3 is a top view of the air electrode disk of the present invention;

FIG. 4 is a side view of the air electrode disk of the present invention;

BEST MODES EMBODIMENTS OF THE PRESENT INVENTION

Figure 5:
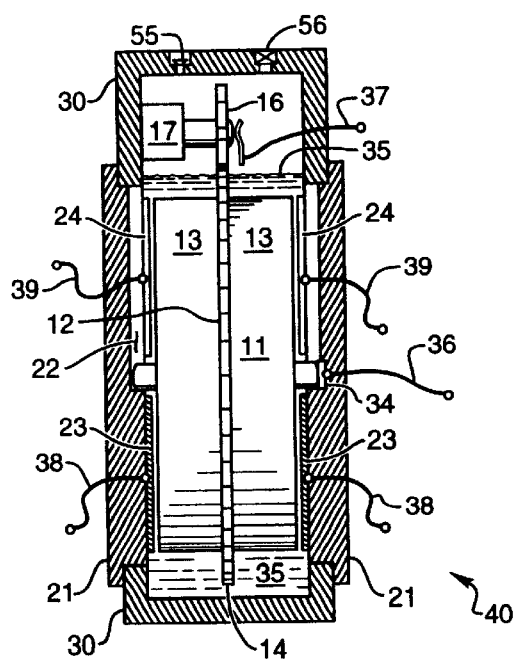
FIG. 5 is a side view of a rotating anode cell of the present invention.

Referring now to the Figs. in the accompanying drawings, the best mode for carrying out the present invention will be described in detail, wherein like elements will be indicated in Figs. with like reference numerals.

As shown in FIGS. 1 and 2, the first component in the metal-air FCB system of the invention comprises an anode disk structure 11 which has a current-collecting anode substrate 12 made out of a metal such as nickel or other electrically conductive material which is resistant to corrosion in basic solutions. The current collecting anode substrate 12 has a layer of anode material 13, which may be a metal such as zinc deposited on the current collecting anode substrate 12. The anode disk 11 has an axle 15 on which it can be rotated. The rotation of the disk can be by gears 16, and motor 17 as shown in FIG. 5, engaging teeth 14 on the anode disk 11 or by motor 17 and drive shaft 47 turning gears 16, engaging teeth 14 on anode disk 11 as shown in FIG. 6.

As shown in FIGS. 3 and 4, the second components in the metal-air FCB system of the invention are air electrode disks 21 which are a little bit larger in diameter than the anode disk 11. The air electrode disks 21 are divided into discharging air electrode potions 23 and recharging air electrode potions 24. The discharging air electrode potions 23 may be of different sized and located in different positions on the air electrode disk 21 to maximize the utility of the designed rates for discharging depending on the types of anodes air electrodes and electrolyte used. The recharging electrode portions 24 may be of different sizes and geometries and located into different positions on the air electrode disk 21 to maximize the utility of the designed rates for discharged depending on the types of anodes air electrodes and electrolytes used. For example, the electrode portions 24 could be arranged radially about the disc 21, they could be concentrically arranged about the disc 21, or any other arrangement consistent with the principles of the present invention.

If more than one set of recharging air electrodes 23 are used in the FCB system, as shown in FIG. 4, then the anode disk 11 can be recharged in two or more different portions simultaneously. Similarly, if more than one set of discharging air electrodes 24 are used in the FCB system, as shown in FIG. 4, then the anode disk 11 can be discharged in two or more different potions of the anode disk 11 simultaneously.

Figure 6:
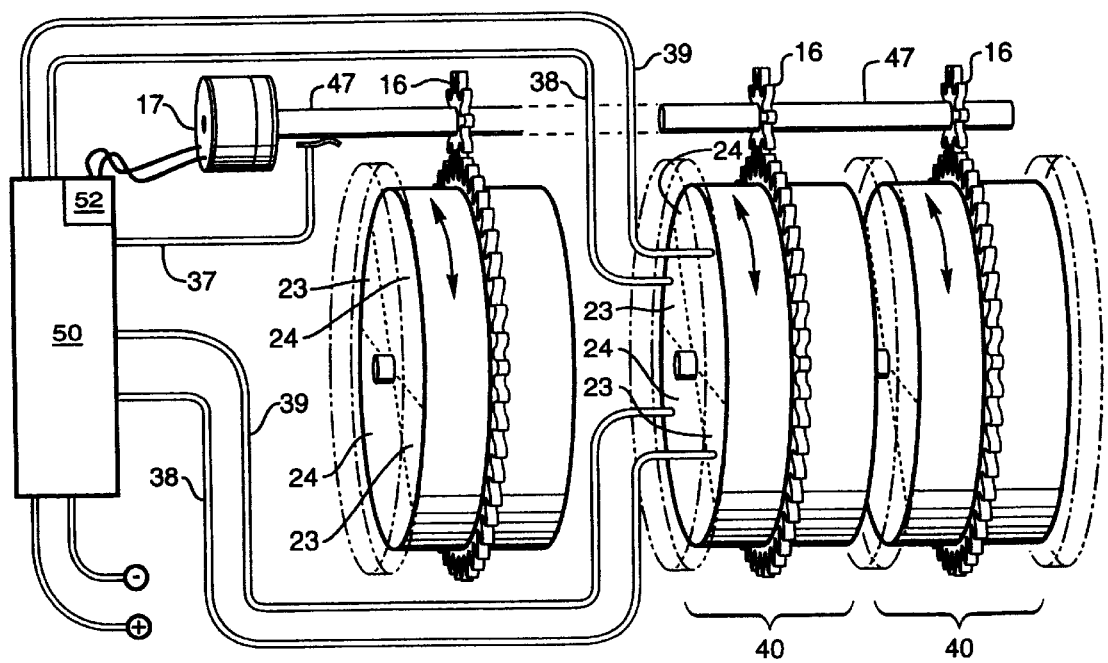
FIG. 6 is a perspective view of a plurality of rotating anode cells making up a fuel cell battery of the present invention.

The air electrode disks 21 may have axle slots 22 for inserting the axle 15 of the anode disk 11 between two air electrode disks 21 so that the anode disk 11 is rotatable on its axle 15 when sandwiched between two air electrode disks 21 as shown in FIG. 5. The axle slots 22 in the air electrode disks 21 allows the anode disk 11 to be changed from time to time by sliding the old anode disk 11 out and inserting a new anode disk 11.

In an alternative embodiment, the anode disk 11 may be permanently fixed between the air electrode disks 21 so that no axle slot 22 is required.

FIG. 5 shows a complete secondary fuel cell battery (FCB) cell 40 in accordance with the present invention. It has an anode material 13, a discharge electrode portion 23, electrolyte 35 and wires 37 and 38 for connecting current generated in the cell 40 to a load. The cell 40 also has a recharging air electrode portion 24 and wires 37 and 39 for supplying current to the cell to recharge the anode material 13. A motor 17 and associated drive gear 16 attached between the air electrode disk 21 engage the gear teeth 14 on the anode disk 11 for rotating the anode disk 11 between the two air electrode disks 21. A seal 30 extending between the air electrode disks 21 at the circumference forms a container with the walls of the air electrode disks 21 for containing electrolyte 35 needed for the fuel cell battery to complete a battery circuit. The seal 30 may have an aperture 56 at the top for adding electrolyte 35 to the cell formed by the anode material 13 and air electrode disk 21 for removing and replacing the anode disk 11. In an alternative embodiment of the present invention, the seal 30 does not cover the top of the cell 40 leaving the motor and gears exposed and allowing easy access for adding electrolyte 35, however, the cell 40 must be upright and is subject to spillage of electrolyte 35.

The motor 17 may be driven at different speeds to maximize recharging or discharging rates. The motor 17 may optionally be outside of the cell 40.

To increase the power of the metal-air FCB system hereof, a number of cells 40 can be joined together. In this way a high voltage can be achieved from the system.

In FIG. 6 a plurality of cells 40 are shown linked together on a common drive shaft 47. Optionally the individual motors of FIG. 5 may be used to drive each anode disk 11 in each cell 40 separately.

As shown in FIG. 6, the discharge air electrode portions 23 and recharging air electrode portions 24 may be clocked (i.e. controllably timed) for air management purposes. The air flowing to the discharge electrode portions 23 or from the recharging air electrode portions will benefit from being clocked in such a manner.

In FIG. 6, the drive shaft 47 will conduct electricity to and from the anode disks 11 by contact with driving gear 16 and gear teeth 14 on the conducting anode substrate 12. A wire 37 connects the drive shaft 47 to the controller 50. Wire 38 connects the discharge air electrode portions 23 of the cell 40 to the controller 50. Wire 39 connects the recharge air electrode portion 24 of the cell 40 to the controller 50. The controller 50 controls the speed for the motor 17, in FIG. 6, or the motors 17, if the cells of FIG. 5 are used.

In an alternate embodiment of the anode disk 11 shown in FIG. 5, the anode substrate 12 can be connected through axle 15 to electrical contact 34 on the air electrode disk 21, where wire 36 will connect the anode disk 11 to the controller 50.

Applicant teaches various methods of and systems for managing the amount of charge stored in a fuel cell battery and the measurement of the rates of charging and discharging, in the following WIPO Publications Nos.: WO 99/18627 entitled "Metal-Air Fuel Cell Battery System Employing Metal-Fuel Tape"; WO 99/18628 entitled "Metal-Air Fuel Cell Battery Systems Employing Metal-Fuel Cards"; and WO 99/18620 entitled "Metal-Air Fuel Cell Battery Systems Employing Moving Anode And Cathode Structures", each incorporated herein by reference in its entirety, as if set forth fully herein. In accordance with the teachings of these WIPO Publications, controller 50 can measure the current flows and other parameters with various sensors, knows the availability of the charge stored on the anode disk 11 and what portion of the disk the charge is stored on. The controller will then manage the discharging and recharging the anode disk 11 to optimize performance of the cells 40 to provide power to a load or to recharge the cells.

A check valve 55, as shown in FIG. 5, may be used on the top of the cell 40 to exhaust oxygen created during recharging, if the oxygen level in the cell increases the pressure of the cell.

An electrolyte refilling port 56 may be located on the top of the cell 40 to replace electrolyte which is spilled leaked or otherwise escapes from the cell 40.

Optionally, the cell 40 may not be sealed at the top for easier access to replace the anode disks 11 or for adding electrolyte.

The operation of the rotating anode device described above has many advantages over the prior art.

The air electrode disk 21 has separate discharge air electrode portions 23 and recharge air electrodes portions 24. By not using bifunctional air electrodes the recharging air electrode 24 and the discharge air electrode 23 can be optimized for the most efficient discharging or recharging of the anode material 13 on the anode disk 11. With a bi-directional motor 17 the anode disk can be turned backward or forward to operate in the most efficient zones on the anode disk 11, such that on discharging the anode disk 111 will be rotated to a position where the most charge is stored or on recharging the disk will be rotated to where the least charge is stored. With a motor speed controller 52 the motor 17 can turn the anode disk 11 at the optimum rate to charge or discharge the anode disk 11.

The surface areas of the discharge air electrode 23 and the recharge air electrodes 24 can be varied to vary the charging to discharging ratio. For example with a ratio of charging to discharging surface area of the air electrodes of 10 to 1 the recharging can take place 10 times faster than the discharging. If the rotating anode fuel cell battery is used for powering a vehicle, fast recharging times may be very important.

Depending on the type of discharge air electrode 23 chosen for discharging the anode material 13, the discharge rates of the anode material 13 will vary. Many factors effect the discharge rate in a fuel cell battery cell, they include but are not limited to the electrolyte 35 used, the spacing between the discharge air electrode 23 and the anode material 13, and the rate at which the anode material 13 is passing in front of the discharge air electrode 23. For example in the art of zinc-air battery cells, various types of anodes and air electrodes have been used in combination. Some air electrodes are better at recharging than for discharging. If the best discharge air electrode 23 is placed on the air electrode disk 21 opposite the anode material 13 on the anode disk 11 and a specified electrolyte 35 is used, the discharge parameters of the system can be maximized for the spacing between the air electrode disk 21 and anode disk 11 for the types of anode materials 13 and discharge air electrodes 23 used.

Similarly for recharging, if the best recharging air electrode 24 is placed on the air electrode disk 21 opposite the anode material 13 on the anode disk 11 and a specified electrolyte 35 is used, then the recharge parameters of the system can be maximized for the spacing between the air electrode disk 21 and anode disk 11 for the types of anode materials 13 and recharge air electrodes 24 used.

Individually maximized air electrodes function better than the bi-functional air electrodes of the prior art systems. The individually maximized air electrodes for recharging will increase the lifetime of the cell by limiting shape change, densification and dendrite problems in the cell.

One reason for the reduction in the anode shape deformation, densification, and dendrite problems is that the recharging is performed over a larger surface area at lower current densities so that the anode material 13 is applied at a slower rate and does not build up quickly in any one place. Further, since the anode is rotating and the electrolyte 35 is being stirred by the motion of the rotating anode disk 11, the anode material is applied more evenly.

Dendrites grow because anode ions are continually attracted to one point on the anode. Since the anode is moving, that point will be changing positions reducing the chances of localized buildup. If the movement of the anode does not totally stop the dendrite growth a wiper blade 28 can be attached to the air electrode disk 21 at the edge of the recharging air electrode portion 24 to scrape off the dendrites.

The rotating anode is scalable, the diameters of the anode disks 11 and the air electrode disks 21 may be increased or decreased to fit the design needs of the user. For example, a small vehicle such as a motor bike would have a smaller diameter rotating anode, than a car or a truck.

By rotating the anode disk 11 between two air electrode disks 21 the depth of discharge (DOD) of the anode disk 11 is increased because it limits passivation. An anode will passivate if too much current is drawn from it in too short a time. Passivation can be substantially decreased if the anode is discharged intermittently (in other words, allowing the anode to rest between dischargings can eliminate passivation). The Movable Anode FCB will do exactly that. As each anode section moves away from the discharge electrodes, it has a rest period before it is discharged some more. In addition, because of the Movable Anode's unique recharging capabilities, the anode can afford to be discharged to a high DOD without sacrifice of cycle life, whereas most recharging batteries must limit their DOD to ensure reasonable recycleability.

Figure 7:
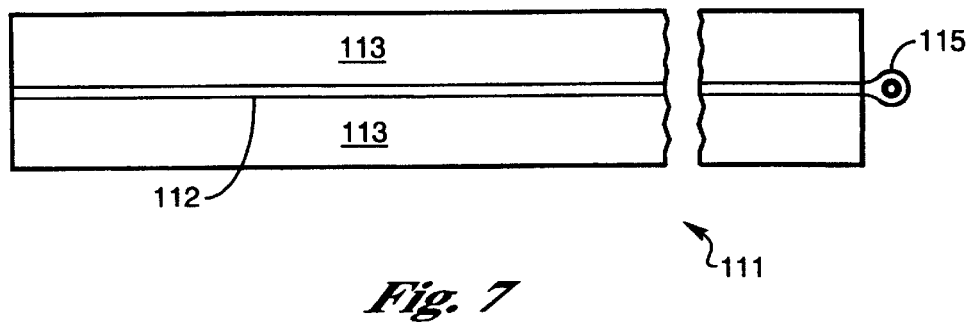
FIG. 7 is a side view of an anode plate of the present invention.
Figure 8:
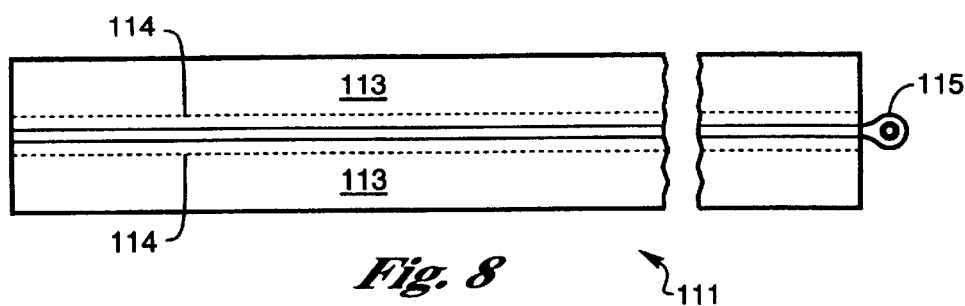
FIG. 8 is a top view of an anode plate of the present invention.
Figure 9:
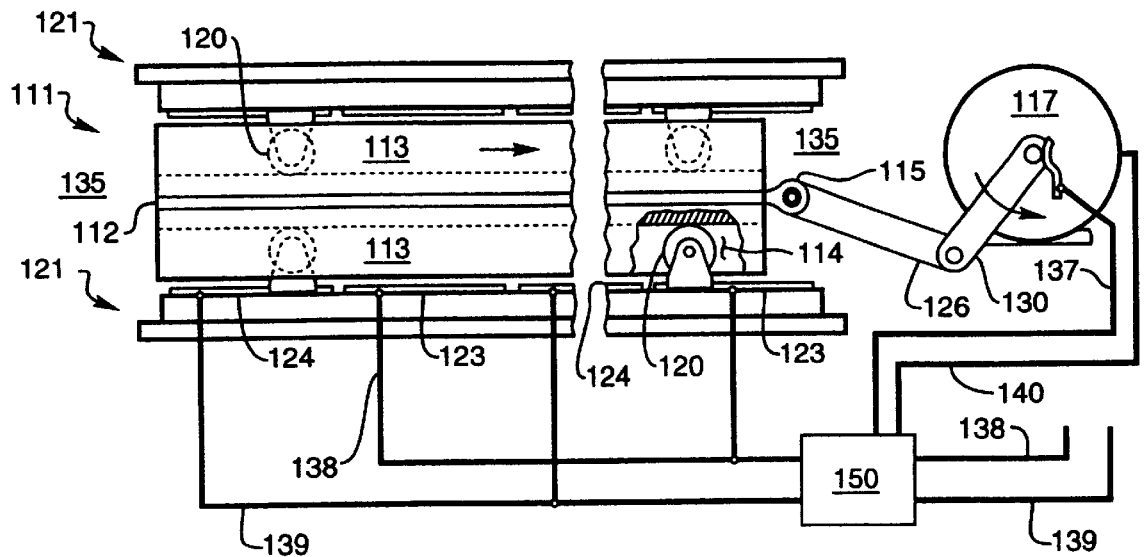
FIG. 9 is a side view of a linear anode cell of the present invention.

In a second embodiment of the invention, as shown in FIGS. 7, 8 and 9, the anode material 113, instead of being rotated between two air electrode disks 21, is moved linearly between two air electrode plates 121 as shown in FIG. 9.

As shown in FIGS. 7 and 8, anode plate 111 has an anode substrate 112 with anode material 113 thereon.

FIG. 9 shows two air electrode plates 121 each having discharging air electrode portions 123 and recharging air electrode portions 124. Wires 138 and 139 connect the controller 150 to the discharging 123 and recharging 124 air electrodes respectively. Wire 137 connects the controller 150 to the anode plate 111 by way of the link arm attached to the anode plate hitch 115. Guide wheels 120 ride on the wheel track 114 portion of the anode plate 111 to moveably hold the anode plate 111 between the wheel guides 120. The link arm 126 is attached to a crank shaft 130 for moving the anode plate 111 back and forth relative to the discharging air electrode portions 123 and recharging air electrode portions 124 of the air electrode plates in electrolyte 135 to charge and discharge the anode material 113 as outlined above. The discharging air electrode portions 123 may be opposite recharging air electrode portions 124 as shown in FIG. 9 or opposite a like air electrode portions. A motor 117 or other means of turning the crank shaft 130 is controlled by controller 150. Wires 140 connect the controller to the motor 117.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying Claims to Invention.

What is claimed is:

1. A movable anode fuel cell battery comprising:
   two air electrodes, each having at least one recharging air electrode portion and at least one discharge air electrode portion;
   an anode having a substrate with a metal anode material on either side of the substrate disposed proximate to and between the two air electrodes and moving with respect to the two air electrodes,
   an electrolyte for contacting the air electrodes and anode material to form a cell, and
   a means for moving the anode material relative to the recharging air electrode portion for recharging the anode material and for moving the anode material relative to the discharging air electrode portion for discharging the anode material.

2. The movable anode fuel cell battery as in claim 1, which further comprises:
   a controller connected to the means for moving the anode material for controlling speed and direction of the anode.

3. The movable anode fuel cell battery as in claim 1 wherein:
   the recharging air electrode portion has a greater area than the discharging air electrode portion such that recharging the anode will be faster than discharging and at a lower current density.

4. The movable anode fuel cell battery as in claim 1, which further comprises:
   a wiper blade attached to the air electrode, adjacent to the recharging air electrode portion, for contacting the anode such that dendrites on the anode will be scraped off the anode by the wiper blade as the anode moves relative to the wiper blade.

5. The movable anode fuel cell battery as in claim 1 wherein there is:
   a means for replacing the anode for mechanically recharging the fuel cell battery with new anodes.

6. The movable anode fuel cell battery as in claim 5 wherein:
   the air electrodes have axle slots and
   the anode has an axle such that the axle engages in the axle slots for removing and replacing anodes.

7. The movable anode fuel cell battery as in claim 1 wherein:
   the anode material rotates relative to the air electrodes.

8. The movable anode fuel cell battery as in claim 1 wherein:
   the anode material moves linearly relative to the air electrodes.

9. The movable anode fuel cell battery as in claim 1 wherein:
   a plurality of movable anode fuel cells operate simultaneously such that their combined electrical output is delivered to a load.

10. The movable anode fuel cell battery as in claim 9 wherein:
    a motor drives a common drive shaft connected to all anodes in the fuel cells such that the drive shaft moves all the anodes at the same time.

11. The movable anode fuel cell battery as in claim 9 wherein:
    each anode fuel cell has a separate motor to drive the anode independently of other anodes.

12. The movable anode fuel cell battery as in claim 11 wherein:
    a controller controls each motor such that each anode in each cell is moved at a speed and direction to maximize the combined electrical output to the load.

13. The movable anode fuel cell battery as in claim 9 wherein:
    the plurality of cells are adjacent to each other and the recharging and discharging air electrode portions for each cell are clocked with respect to the adjacent cells for air management.

14. A movable anode fuel cell battery (FCB) system comprising:
    two air electrodes, each said electrode having at least one recharging air electrode portion and at least one discharge air electrode portion;
    an anode having a substrate with a metal anode material disposed on either side of said substrate, and said substrate being disposed proximate to and between said two air electrodes and moving with respect to the two air electrodes;
    an electrolyte for contacting said air electrodes and said metal anode material to form a cell; and
    a first mechanism for moving the anode material relative to said recharging air electrode portion for recharging said anode material, and for moving said anode material relative to said discharging air electrode portion for discharging said anode material.

15. The movable anode FCB system of claim 14, which further comprises:
    a controller connected to the first mechanism for controlling speed and direction of the anode.

16. The movable anode FCB system of claim 14, wherein:
    the recharging air electrode portion has a greater area than the discharging air electrode portion such that recharging the anode will be faster than discharging and at a lower current density.

17. The movable anode FCB system of claim 14, which further comprises:
    a wiper blade attached to the air electrode, adjacent to the recharging air electrode portion, for contacting the anode such that dendrites on the anode are scraped off the anode by the wiper blade as the anode moves relative to the wiper blade.

18. The movable anode FCB system of claim 14, which further comprises:

a second mechanism for replacing the anode for mechanically recharging the fuel cell battery with new anodes.

19. The movable anode FCB system of claim 18, wherein:

the air electrodes have axle slots and the anode has an axle such that the axle engages in the axle slots for removing and replacing anodes.

20. The movable anode FCB system of claim 14, wherein:

the anode material rotates relative to the air electrodes.

21. The movable anode FCB system of claim 14, wherein:

the anode material moves linearly relative to the air electrodes.

22. The movable anode FCB system of claim 14, wherein:

a plurality of movable anode fuel cells operate simultaneously such that their combined electrical output is delivered to a load.

23. The movable anode FCB system of claim 22, wherein:

a motor drives a common drive shaft connected to all anodes in the fuel cells such that the drive shaft moves all the anodes at the same time.

24. The movable anode FCB system of claim 22, wherein:

each anode fuel cell has a separate motor to drive the anode independently of other anodes.

25. The movable anode FCB system of claim 24, wherein:

a controller controls each motor such that each anode in each cell is moved at a speed and direction to maximize the combined electrical output to the load.

26. The movable anode FCB system of claim 22, wherein:

the plurality of cells are adjacent to each other and the recharging and discharging air electrode portions for each cell are clocked with respect to the adjacent cells for air management.

27. A movable anode fuel cell battery comprising:

two air electrodes, each having at least one recharging air electrode portion and at least one discharge air electrode portion;

an anode having a substrate with a metal anode material on either side of the substrate disposed proximate to and between the two air electrodes and moving with respect to the two air electrodes, an electrolyte for contacting the air electrodes and anode material to form a cell, and a first mechanism coupled to the anode material, wherein upon activation of the first mechanism the anode material is moved relative to the recharging air electrode portion for recharging the anode material and the anode material is moved relative to the discharging air electrode portion for discharging the anode material.

28. The movable anode fuel cell battery as in claim 27, wherein the anode material is moved rotationally with respect to the recharging air electrode portion for recharging the anode material and with respect to the discharging air electrode portion for discharging the anode material.

29. The movable anode fuel cell battery as in claim 27, wherein the anode material is moved linearly with respect to the recharging air electrode portion for recharging the anode material and with respect to the discharging air electrode portion for discharging the anode material.

\* \* \* \* \*